United States Patent [19]

Hagersten et al.

[11] Patent Number: 5,940,860
[45] Date of Patent: Aug. 17, 1999

[54] METHODS AND APPARATUS FOR SUBSTANTIALLY MEMORY-LESS COHERENCE TRANSFORMER FOR CONNECTING COMPUTER NODE COHERENCE DOMAINS

[75] Inventors: Erik E. Hagersten, Palo Alto, Calif.; Mark Donald Hill; David A. Wood, both of Madison, Wis.

[73] Assignee: Sun Microsystems, Inc., Mountain View, Calif.

[21] Appl. No.: 08/677,012

[22] Filed: Jul. 1, 1996

[51] Int. Cl.$^6$ .............................. G06F 13/36; G06F 13/42
[52] U.S. Cl. .................... 711/147; 711/141; 711/144; 711/145; 395/200.43; 395/200.46
[58] Field of Search .................... 711/141, 119, 711/120, 121, 124, 145, 147, 144; 395/200.43, 200.44, 200.46, 200.47, 200.78

[56] References Cited

U.S. PATENT DOCUMENTS

| | | | |
|---|---|---|---|
| 4,539,655 | 9/1985 | Trussell et al. | 395/280 |
| 4,891,751 | 1/1990 | Call et al. | 395/800.06 |
| 5,072,369 | 12/1991 | Theus et al. | 711/146 |
| 5,182,801 | 1/1993 | Asfour | 395/200.44 |
| 5,283,886 | 2/1994 | Nishii et al. | 711/144 |
| 5,303,362 | 4/1994 | Butts, Jr. et al. | 711/121 |
| 5,522,045 | 5/1996 | Sandberg | 395/200.43 |
| 5,522,058 | 5/1996 | Iwasa et al. | 395/472 |
| 5,557,769 | 9/1996 | Bailey et al. | 711/146 |
| 5,579,504 | 11/1996 | Callander et al. | 711/144 |
| 5,588,131 | 12/1996 | Borrill | 711/146 |
| 5,590,308 | 12/1996 | Shih | 711/136 |
| 5,592,625 | 1/1997 | Sandberg | 711/147 |
| 5,634,110 | 5/1997 | Laudon et al. | 711/145 |
| 5,644,753 | 7/1997 | Ebrahim et al. | 711/131 |
| 5,655,100 | 8/1997 | Ebrahim et al. | 711/144 |
| 5,710,907 | 1/1998 | Hagersten et al. | 711/145 |

FOREIGN PATENT DOCUMENTS

0392657  10/1990  European Pat. Off. .

OTHER PUBLICATIONS

Lovett, et al., "Sting: A CC–NUMA Computer Iystem for the Commercial Marketplace", Sequent Computer Systems, Inc., 15450 SW Koll Parkway, Beaverton, Oregon 97006, XP 000592195, ISCA '96 May 1996 PA, USA.

Iwasa, et al., "SSM–MP: More Scalability in Shared–Memory Multi–Processor", Information and Communication Systems Laboratory, Toshiba Corporation, 2–9 Suehiro–cho Ome–shi Tokyo 198 Japan, 1995 IEEE.

Lenoski, et al., "The Stanford Dash Multiprocessor", 25 (1992) Mar., No.3, Los Alamitos, CA US.

Krafka, et al., "An Empirical Evaluation of Two–Memory–Efficient Directory Methods", Department of Electrical Engineering and Computer Sciences, University of California, Berkeley, 1990 IEEE.

*Primary Examiner*—Glenn Gossage
*Attorney, Agent, or Firm*—Beyer & Weaver, LLP.

[57] ABSTRACT

An apparatus and method for facilitating the sharing of memory blocks between a computer node and an external device irrespective whether the external device and the common bus both employ a common protocol and irrespective whether the external device and the common bus both operate at the same speed. Each of the memory blocks has a local physical address at a memory module of the computer node and an associated memory tag (Mtag) for tracking a state associated with that memory block, including a state for indicating whether that memory block is exclusive to the computer node, a state for indicating whether that memory block is shared by the computer node with the external device, and a state for indicating whether that memory block is invalid in the computer node. The apparatus includes receiver logic configured to receive, when coupled to the common bus of the computers node, memory access requests specific to the apparatus on the common bus. There is further included a protocol transformer logic coupled to the receiver logic for enabling the apparatus, when coupled to the external device, to communicate with the external device using a protocol suitable for communicating with the external device irrespective of the external device speed or protoco.

36 Claims, 10 Drawing Sheets

| STATE | REPRESENTING | MEANING |
|---|---|---|
| gM | Global Modified | Internal domain has a valid, exclusive (and potentially modified) copy; there are no valid external copies |
| gS | Global Shared | Internal domain has valid, shared copy or copies; there may be shared copy or copies externally |
| gI | Global Invalid | Internal domain does not have a valid (exclusive or shared) copy; there is a valid exclusive (and potentially modified) external copy |

Fig. 4

| REQUEST | ACTION | POSSIBLE RESPONSES |
|---------|--------|--------------------|
| RTO | Get exclusive copy of memory block and invalidate all other copies | RTO_data, RTO_nack |
| RRTO | Get exclusive copy of memory block from external side and invalidate all other copies | RTOR_data, RTOR_nack |
| RTS | Get shared, read-only copy of memory block | RTS_data, RTS_nack |
| RRTS | Get shared, read-only copy of memory block from external side | RTSR_data, RTSR_nack |
| WB | Request to write back currently cached exclusive copy of memory block | WB_ack, WB_nack |

Fig. 8

| RESPONSES | ACTION | DATA? |
| --- | --- | --- |
| RTO_data | Reply with exclusive copy of memory block | Y |
| RTO_nack | Not acknowledged, retry RTO progenitor | N |
| RTOR | write a gM state to memory for the requested memory block | Y |
| RTOR_data | Reply with exclusive copy of memory block | Y |
| RTOR_nack | Not acknowledged, retry RRTO progenitor | N |
| RTS_data | Reply with shared copy of memory block | Y |
| RTS_nack | Not acknowledged, retry RTS progenitor | N |
| RTSR | write a gS state to memory for the requested memory block | Y |
| RTSR_data | Reply with shared copy of memory block | Y |
| RTSR_nack | Not acknowledged, retry RRTS progenitor | N |
| WB_nack | Not acknowledged, retry WB progenitor | Y |
| WB_data | Reply with data to be written back | Y |

Fig. 9

| Bus to CT | MTag | CT to X | X to CT | CT to Bus | Bus to CT | New MTag | Comments |
|---|---|---|---|---|---|---|---|
| RRTO | gM | | | | | | Error: Ask RRTO progenitor to retry. |
| | gS | XINV | XINV_ack | RTO | RTO_data | | |
| | | | | RTOR | | gM | |
| | | | | RTOR_data | | | |
| | gI | XRTO | XRTO_data | RTOR | | gM | |
| | | | | RTOR_data | | | |
| RRTS | gM, gS | | | | | | Error: Ask RRTO progenitor to retry. |
| | gI | XRTS | XRTS_data | RTSR | | gS | |
| | | | | RTSR_data | | | |

Fig. 10

| X to CT | MTag | CT to Bus | Bus to CT | CT to X | X to CT | New MTag | Comments |
|---|---|---|---|---|---|---|---|
| XRTO | gM gS | RTO WB WB_data | RTO_data | XRTO_data | | | |
| | gI | | | | | gI | Error |
| XRTS | gM, gS | RTSM | RTSM_data | XRTS_data | | | |
| | gI | | | | | gS | Error |
| XWB | gM, gS | | | | | | Error |
| | gI | WSgM WSgM_data | | | XWB_data | gM | |

Fig. 11

METHODS AND APPARATUS FOR SUBSTANTIALLY MEMORY-LESS COHERENCE TRANSFORMER FOR CONNECTING COMPUTER NODE COHERENCE DOMAINS

CROSS REFERENCE TO RELATED PATENT APPLICATIONS

This patent application is related to the following copending, commonly assigned patent applications, the disclosures of which are incorporated herein by reference in their entirety:

"Methods and Apparatus For a Coherence Transformer For Connecting Computer System Coherence Domains" by Hagersten et al., filed concurrently herewith. (application Ser. No. 08/677,015).

"Methods and Apparatus For a Coherence Transformer With Limited Memory For Connecting Computer System Coherence Domains" by Hagersten et al., filed concurrently herewith (application Ser. No. 08/677,014, now U.S. Pat. No. 5,829,034.

BACKGROUND OF THE INVENTION

The present invention relates to a method and an apparatus for sharing memory among coherence domains of computer systems. More specifically, the invention relates to a novel method and apparatus for efficiently solving coherence problems when memory blocks having local physical addresses (LPA) in a particular computer node of a computer system are shared by other nodes of the system as well as by external entities coupled to that computer node.

The sharing of memory among multiple coherence domains presents unique coherence problems. To facilitate a discussion of these coherence problems, FIG. 1 shows a computer node 100 representing, e.g., a computer node in a more complex computer system. Within computer node 100, there are shown a plurality of processing nodes 102, 104, and 106 coupled to a common bus 108. Each of processing nodes 102, 104, and 106 represents, for example, a discrete processing unit that may include, e.g., a processor and its own memory cache. The number of processing nodes provided per computer node 100 may vary depending on needs, and may include any arbitrary number although only three are shown herein for simplicity of illustration.

Within computer node 100, a common bus 108 is shown coupled to a memory module 110, which represents the memory space of computer node 100 and may be implemented using a conventional type of memory such as dynamic random access memory (DRAM). Memory module 110 is typically organized into a plurality of uniquely addressable memory blocks 112. Each memory block of memory module 110, e.g., memory block 112(a) or memory block 112(b), has a local physical address (LPA) within computer node 100, i.e., its unique address maps into the memory space of computer 100. Each memory block 112 represents a storage unit for storing data, and each may be shared among processing nodes 102, 104, and 106 via common bus 108. Of course, there may be provided as many memory blocks as desired to satisfy the storage needs of computer node 100.

As is known to those skilled in the art, computer processors, e.g., processor 116 within processing node 102, typically operates at a faster speed than the speed of the memory module 110. To expedite access to the memory blocks 112 of memory module 110, there is usually provided with each processing node, e.g., processing node 102, a memory cache 114. A memory cache, e.g., memory cache 114, takes advantage of the fact that a processor, e.g., processor 116, is more likely to reference memory addresses that it recently referenced than other random memory locations. Further, memory cache 114 typically employs faster memory and tends to be small, which further contributes to speedy operation.

Within memory cache 114, there exists a plurality of block frames 118 for storing copies of memory blocks, e.g., memory blocks 112. Each block frame 118 has an address portion 120 for storing the address of the memory block it cached. If the unique address of memory block 112(a) is, e.g., FF5h, this address would be stored in address portion 120 of a block frame 118 when memory block 112(a) of memory module 110 is cached into memory cache 114. There is also provided in block frame 118 a data portion 122 for storing the data value of the cached memory block. For example, if the value stored in memory block 112(a) was 12 when memory block 112(a) was cached into block frame 118, this value 12 would be stored in data portion 122 of block frame 118.

Also provided in block frame 118 is a status tag 124 for storing the state of the memory block it cached. Examples of such states are, e.g., gM, gS, and gI, representing respectively global exclusive, global shared, and global invalid. The meanings of these states are discussed in greater detail herein, e.g., with reference to FIG. 4.

A processing node may hold an exclusive copy of a memory block in its cache when it is the only entity having a valid copy. Such exclusive copy may potentially be different from its counterpart in memory module 110, e.g., it may have been modified by the processing node that cached it. Alternatively, a processing node may possess a shared, read-only copy of a memory block. When one processing node, e.g., processing node 102, caches a shared copy of a memory block, e.g., memory block 112(a), other processing nodes, e.g., processing nodes 104 and 106, may also possess shared copies of the same memory block.

If a memory block is never cached in a processing node or it was once cached but is no longer cached therein, that processing node is said to have an invalid copy of the memory block. No valid data is contained in the block frame when the state associated with that block frame is invalid.

The coherence problem that may arise when memory block 112 is shared among the processing nodes of FIG. 1 will now be discussed in detail. Assuming that processing node 102 caches a copy of memory block 112(a) into its memory cache 114 to change the value stored in memory block 112 from 12 to 13. Typically, when the value is changed by a processing node such as processing node 102, that value is not updated back into memory module 110 immediately. Rather, the updating is typically performed when memory cache 114 of processing node 102 writes back the copy of memory block 112(a) it had earlier cached.

Now suppose that before memory cache 114 has a chance to write back the changed value of memory block 112(a), i.e., 13, into memory module 110, processing node 104 wishes to reference memory block 112(a). Processing node 104 would first ascertain in its own memory cache 132 to determine whether a copy of memory block 112(a) had been cached therein earlier. Assuming that a copy of memory block 112(a) has never been cached by processing node 104, a cache miss would occur.

Upon experiencing the cache miss, processing node 104 may then proceed to obtain a copy of memory block 112(a)

from memory module 110. Since the changed value of memory block 112(a) has not been written back into memory module 110 by processing node 102, the old value stored in memory block 112(a), i.e., 12, would be acquired by processing node 104. This problem is referred to herein as the coherence problem and has the potential to provide erroneous values to processing nodes and other devices that share a common memory.

Up to now, the sharing of memory blocks 112 is illustrated only with reference to devices internal to computer node 100, i.e., devices such as processing nodes 102, 104, and 106 that are designed to be coupled to common bus 108 and communicate thereto employing the same communication protocol. There may be times when it is necessary to couple computer node 100 to other external devices, e.g., to facilitate the expansion of the computer system. Oftentimes, the external devices may employ a different protocol from that employed on common bus 108 of computer node 100 and may even operate at a different speed.

External device 140 of FIG. 1 represents such an external device. For discussion purposes, external device 140 may represent, for example, an input/output (I/O) device such as a gateway to a network. Alternatively, external device 140 may be, for example, a processor such as a Pentium Pro™ microprocessor (available from Intel. Corp. of Santa Clara, Calif.), representing a processor whose protocol and operating speed may differ from those on common bus 108. As a further example, external device 140 may represent a distributed shared memory agent for coupling computer node 100 to other entities having their own memory spaces, e.g., other computer nodes having their own memory modules. Via the distributed shared memory agent, the memory blocks within computer node 100 as well as within those other memory-space-containing entities may be shared.

Although an external device may need to share the data stored in memory module 110, it is typically not possible to couple an external device, such as external device 140, directly to common bus 108 to allow external device 140 to share the memory blocks in memory module 110. The direct coupling is not possible due to, among others, the aforementioned differences in protocols and operating speeds.

In view of the foregoing, what is needed is an improved method and apparatus for permitting memory blocks having a local physical address (LPA) in a particular computer node to be shared, in an efficient and error-free manner, among interconnected entities such as other processing nodes and external devices.

SUMMARY OF THE INVENTION

The invention relates, in one embodiment, to a method in a computer system having a computer node which has a common bus, for permitting an external device to share memory blocks having local physical addresses in a memory module at the computer node irrespective whether the external device and the common bus both employ a common protocol and irrespective whether the external device and the common bus both operate at the same speed. Each of the memory blocks has an associated memory tag (Mtag) for tracking a state associated with that memory block, including a state for indicating whether that memory block is exclusive to the computer node, a state for indicating whether that memory block is shared by the computer node with the external device, and a state for indicating whether that memory block is invalid in the computer node.

The method includes the step of receiving, at a coherence transformer coupled to the common bus, a memory access request for a first memory block from the external device. There is further included the step of obtaining the first memory block, using the coherence transformer, from the common bus. Additionally, there is the step of modifying, using the coherence transformer, a first Mtag associated with the first memory block in the memory module at the computer node to reflect that the external device is caching a valid copy of the first memory block. Further, there is included the step of sending the valid copy of the first memory block from the coherence transformer to the external device.

In another embodiment, the invention relates to a method in a computer system having a computer node which has a common bus, for permitting an external device to share memory blocks having local physical addresses in a memory module at the computer node through a coherence transformer coupled to a common bus of the computer node. The method facilitates the sharing irrespective whether the external device and the common bus both employ a common protocol and irrespective whether the external device and the common bus both operate at the same speed. Each of the memory blocks has an associated Mtag for tracking a state associated with that memory block, including a state for indicating whether that memory block is exclusive to the computer node, a state for indicating whether that memory block is shared by the computer node with the external device, and a state for indicating whether that memory block is invalid in the computer node.

The method includes the step of receiving, at the memory module via the common bus, a first memory access request for a valid copy of a first memory block of the memory blocks from a progenitor of the first memory access request, the progenitor being an entity different from the coherence transformer. There is further included the step of responding to the first memory access request by sending a first copy of the first memory block, along with a first Mtag corresponding to the first memory block, from the memory module to the progenitor of the first memory access request. Additionally, there is also included the step of examining, using the progenitor of the first memory access request, the first Mtag state. Further, there is included the step of issuing, if the first Mtag state is invalid, a second memory access request pertaining to the first memory block from the progenitor of the first memory access request to request the coherence transformer to service the second memory access request, thereby permitting the progenitor of the first memory access request to obtain the valid copy of the first memory block.

In yet another embodiment, the invention relates to an apparatus for facilitating the sharing of memory blocks between a computer node and an external device irrespective whether the external device and the common bus both employ a common protocol and irrespective whether the external device and the common bus both operate at the same speed. Each of the memory blocks has a local physical address at a memory module of the computer node and an associated Mtag for tracking a state associated with that memory block, including a state for indicating whether that memory block is exclusive to the computer node, a state for indicating whether that memory block is shared by the computer node with the external device, and a state for indicating whether that memory block is invalid in the computer node.

The apparatus includes receiver logic configured for coupling with a common bus of the computer node, the receiver logic being configured to receive, when coupled to the common bus, memory access requests specific to the apparatus on the common bus. There is further included a protocol transformer logic coupled to the receiver logic for permitting the apparatus, when coupled to the external device, to communicate with the external device using a protocol suitable for communicating with the external device.

These and other advantages of the present invention will become apparent upon reading the following detailed descriptions and studying the various figures of the drawings.

BRIEF DESCRIPTION OF THE DRAWINGS

FIG. 4 shows, in one embodiment of the present invention, the various available states that may be stored in an Mtag.

FIGS. 8 and 9 show, in one embodiment, the various memory access requests and responses that may be issued by a bus entity.

FIG. 10 illustrates, in one embodiment of the present invention, selected transactions performed by the coherence transformer in response to remote memory access requests on the common bus.

FIG. 11 illustrates selected transactions performed by the coherence transformer in response to memory access requests from one of the external devices.

DETAILED DESCRIPTION OF THE PREFERRED EMBODIMENTS

An invention is described for permitting memory blocks having a local physical address (LPA) in a particular computer node to be shared, in an efficient and error-free manner, among interconnected entities such as internal processing nodes and external devices. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, there is provided a coherence transformer for coupling a computer node, e.g., computer node 100, to a plurality of external devices. The coherence transformer permits an external device, which may employ a different protocol from that employed by computer node 100 and may even operate at a different speed, to access memory blocks having local physical addresses within computer node 100. In one aspect of the present invention, the coherence transformer monitors for selected memory access requests on the bus of computer node 100. If one of the selected memory access requests on the bus of computer node 100 pertains to a memory block currently cached by an external device, the coherence transformer may provide the latest copy of that memory block to the requesting entity, thereby avoiding a coherence problem. Further, the coherence transformer also permits the external devices to coherently obtain copies of memory blocks having local physical addresses within computer node 100.

Figure 1:
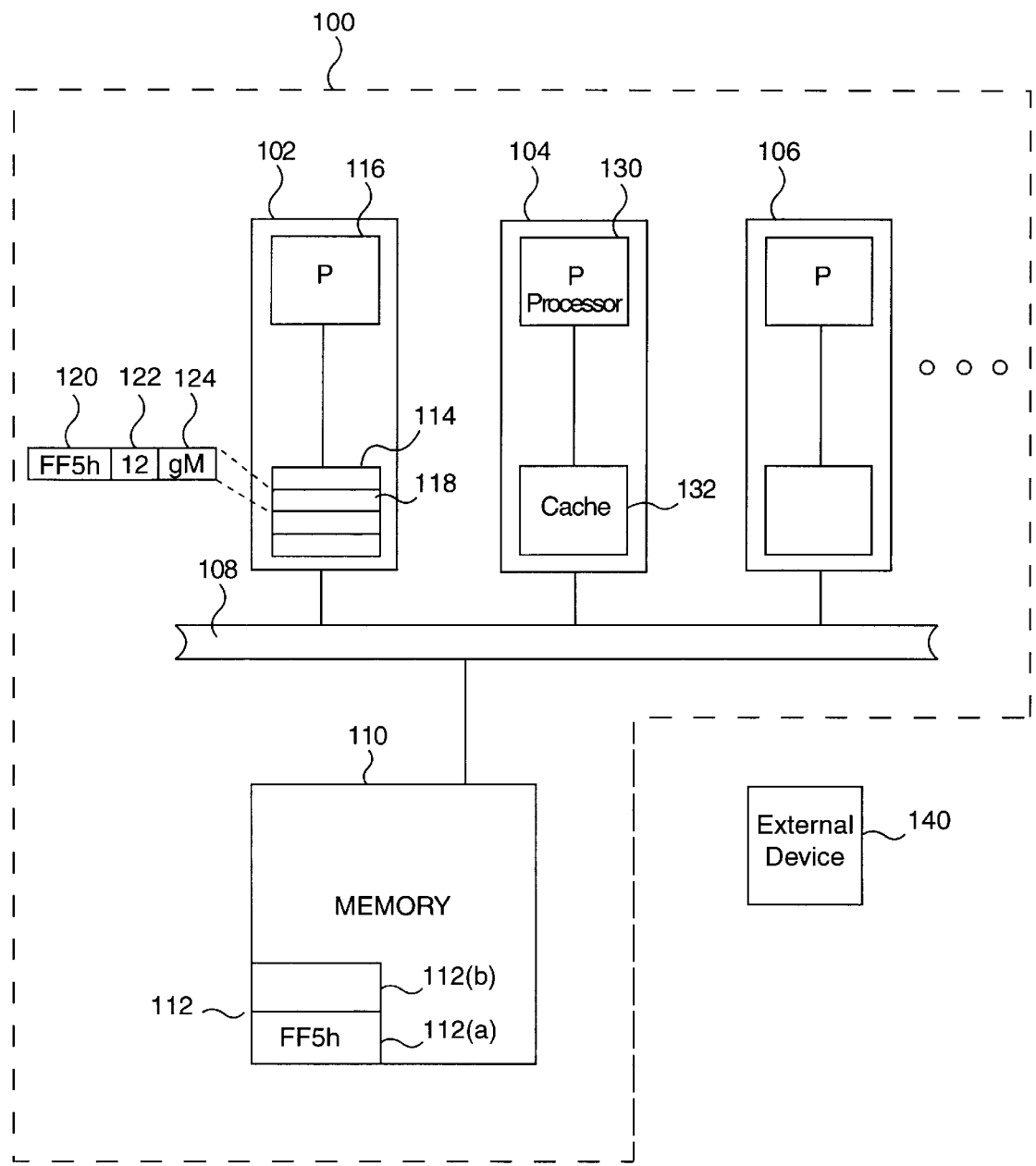
FIG. 1 shows, for discussion purposes, a computer node representing, e.g., a computer node in a more complex computer system.
Figure 2:
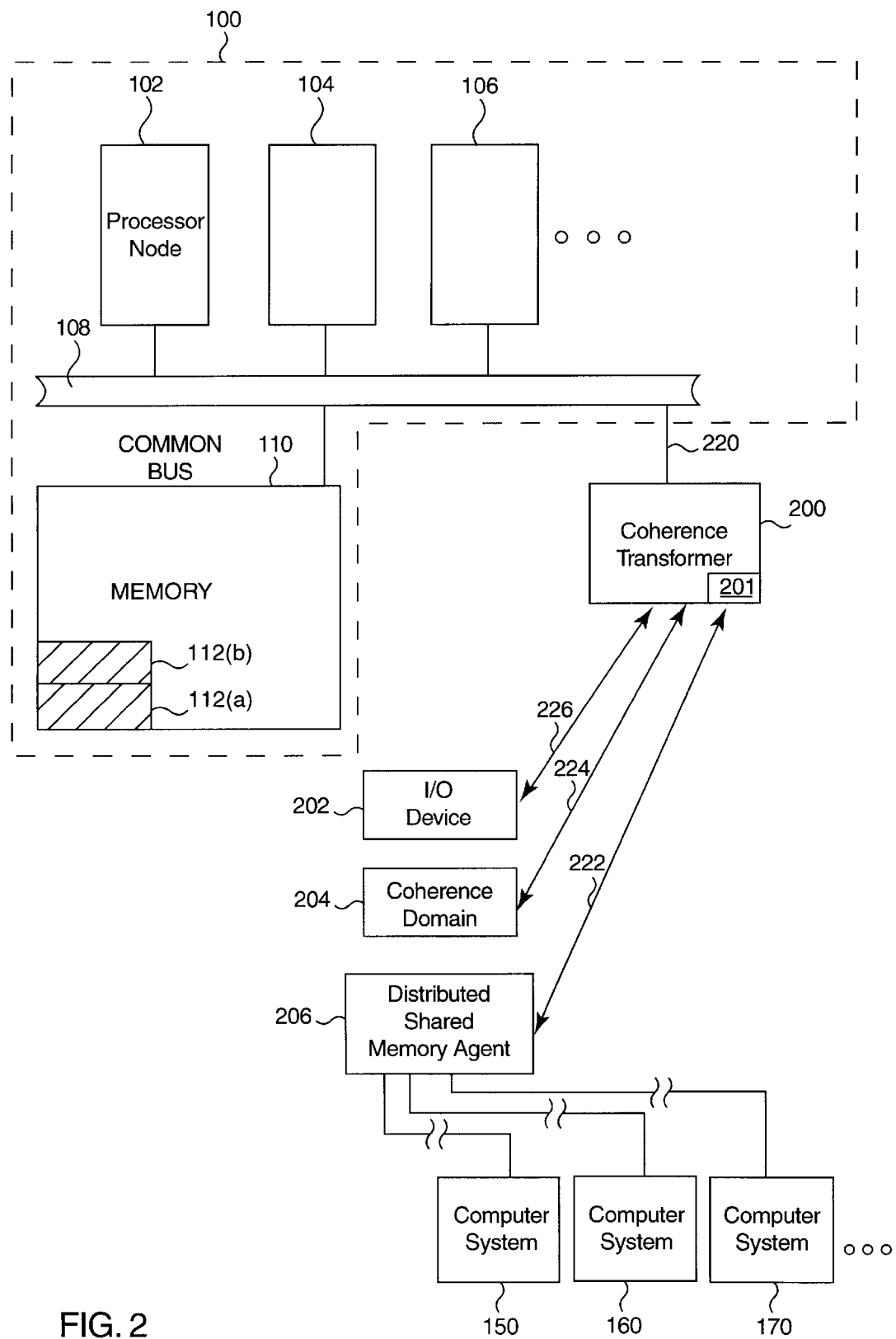
FIG. 2 shows, in accordance with one aspect of the present invention, a coherence transformer.

The operational details of the coherence transformer may be better understood with reference to the drawings that follow. Referring now to FIG. 2, there is provided, in accordance with one aspect of the present invention, a coherence transformer 200 for coupling computer node 100 to one of a plurality of external devices 202, 204, and 206. Note that although only one of each type of external device (202, 204, or 206) is shown for ease of illustration, there may in fact exist many external devices of each type coupled to coherence transformer 200. Via coherence transformer 200, the contents of the memory blocks of memory module 110, e.g., memory blocks 112, may be accessed by any of external devices 202, 204, and 206. In accordance with one aspect of the present invention, memory blocks of memory module 110 may be shared by the external devices although these external devices employ protocols and operate at speeds different from those on common bus 108 of computer node 100.

External device 202 may represent, for example, an I/O device such as a gateway to a computer network that may obtain a few memory blocks 112 at a time from memory module 110 via coherence transformer 200. External device 204 may represent, for example, a coherence domain such as a processor, whose internal protocol and operating speed may differ from that running on common bus 108. Examples of differences include differences in block sizes and signaling. External device 206 may represent, for example, a distributed shared memory agent device.

Distributed shared memory agent device 206 may include logic circuitry, implemented either in hardware or software, for connecting computer node 100 to other distributed shared memory (DSM) domains such as other computer nodes to facilitate the sharing of memory blocks among different DSM domains and with computer node 100. Further, distributed shared memory agent device 206 may permit a processing node 102 in computer node 100 to access memory blocks 112 within its local memory module 110 as well as well memory blocks associated with memory modules within computer systems or nodes 150, 160, and 170, and vice versa. The use of distributed shared memory agent 206 creates the illusion that there is a centralized shared memory resource that the processors within computer nodes 100, 150, 160, and 170 may access although this centralized memory resource is physically implemented and distributed among different computer nodes.

Coherence transformer 200 may communicate with common bus 108 of computer node 100 via a coherence transformer link 220. On the external domain, coherence transformer 200 may communicate with any of the external devices e.g., any of external devices 202, 204, and 206, via links 222, 224, and 226 using a protocol that is appropriate for the external device with which it communicates.

Figure 3:
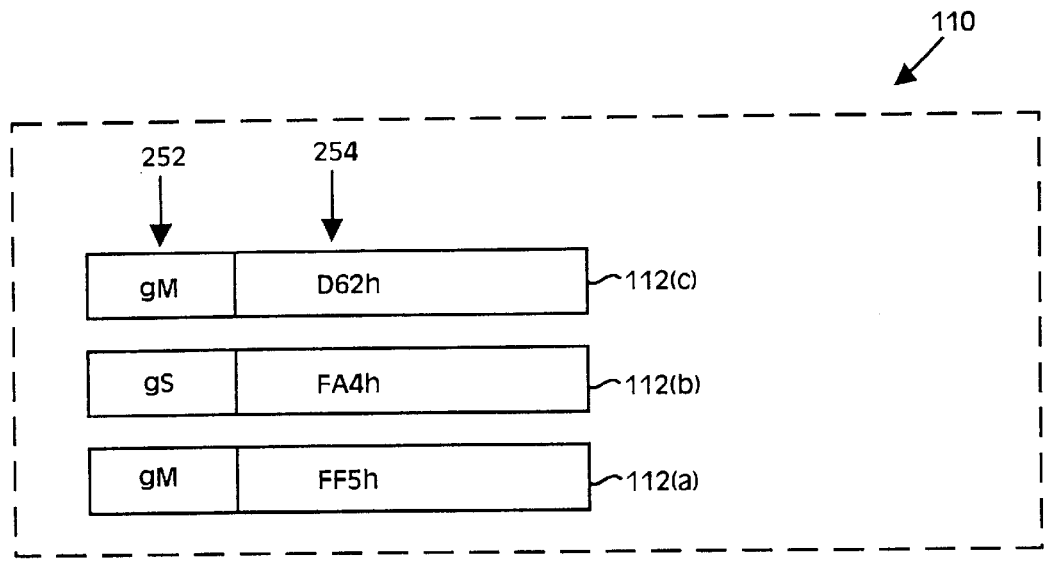
FIG. 3 shows, in accordance with one aspect of the present invention, the memory blocks and their associated memory tags (Mtags).

Referring now to FIG. 3, there are shown in memory module 110, in accordance with one aspect of the present invention, a plurality of memory tags (Mtags) 252. Each Mtag 252 is logically associated with a memory block 254 within memory module 110. In one embodiment, Mtags 252 are implemented in the same memory space, e.g., dynamic random access memory (DRAM), as the memory blocks with which they are associated and may be physically adjacent to their respective memory blocks 112. In another embodiment, Mtags 252 are logically associated with their respective memory blocks 112, albeit being implemented in a different memory space.

An Mtag 252 tracks the global state of its respective memory block, i.e., whether computer node 100 has exclusive, shared, or invalid access to a memory block (irrespective of which processing node has that memory block). FIG. 4 shows, in one embodiment of the present invention, the various available states that may be stored in an Mtag 252. In FIG. 4, three possible states are shown: gI, gS, or gM, signifying respectively that an invalid, shared, or exclusive copy of a memory block is being held by internal entities, i.e., entities within computer node 100. Note that for the purposes of the present invention, the state of an Mtag 252 is determined by whether its associated memory block is referenced by internal entities (e.g., by memory module 110 or any of processors 102, 104, and 106) or by devices in the external domain (i.e., external to computer node 100 such as any of external devices 202, 204, and 206). Further, the state of each Mtag is generally independent of which specific device within these domains currently has the memory block. Consequently, an Mtag can generally indicate whether an external device has a valid copy of a memory block. The state of an Mtag generally cannot indicate which device, either internally or externally, currently has the latest valid copy.

If the state of Mtag 252 is gM, the internal domain has a valid, exclusive (and potentially modified from the copy in memory module 110) copy of the associated memory block. Further, there can be no valid (whether exclusive or shared) copy of the same memory block in the external domain since there can be no other valid copy of the same memory block existing anywhere when an exclusive copy is cached by a given device. If the state of Mtag 252 is gS, the internal domain has a valid, shared copy of the associated memory block. Further, since many shared copies of the same memory block can exist concurrently in a computer system, the external domain may have other shared copies of the same memory block as well. If the state of Mtag 252 is gI, the internal domain does not have a valid copy of the associated memory block. Since neither memory module 110 nor any bus entities 102, 104, and 106 has a valid copy, the valid copy may reside in the external domain. In one embodiment, when the state of Mtag 252 is gI, it is understood that the external domain has an exclusive (and potentially modified) copy of the associated memory block.

Figure 5:
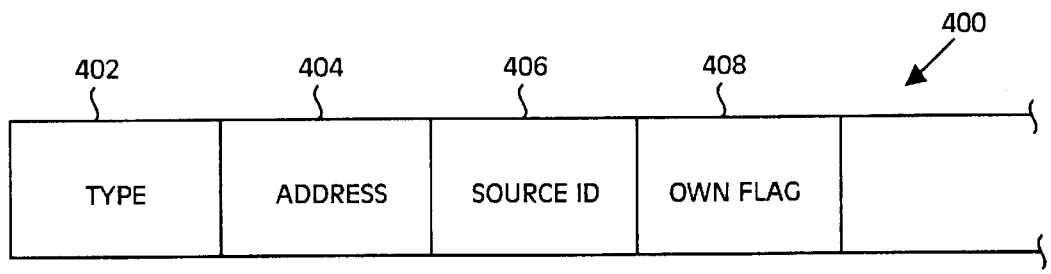
FIG. 5 shows in greater detail, in accordance with one aspect of the present invention, the format of a typical memory access request on common bus 108.

FIG. 5 shows in greater detail in accordance with one aspect of the present invention the format a memory access request 400, representing a typical memory access request on common bus 108. The memory access request may be output by, for example, one of the processing nodes 102, 104, or 106 or by coherence transformer 200 on behalf of one of the external devices 202, 204, or 206.

Memory access request 400 typically includes a type field 402, an address field 404, a source ID field (SID) 406, and an own flag 408. Type field 402 specifies the type of memory access request being issued. As will be discussed in detail in connection with FIG. 8 herein, memory access request types specified in field 402 may include, among others, a request to own (RTO), remote request to own (RRTO), request to share (RTS), remote request to share ARTS), and write back (WB). Address field 404 specifies the address of the memory block being requested by the progenitor of memory access request 400. Source ID field 406 specifies the identity of the progenitor of memory access request 400, i.e., the entity that issues memory access request 400.

Own flag 408 represents the flag bit that is normally reset until one of the entities other than memory 110 that is capable of servicing the outstanding memory access request, e.g., one of processing nodes 100–106, sets own flag 408. An entity coupled to common bus 108 may wish to set own flag 408 to indicate that the current memory access request should not be serviced by memory module 110, i.e., one of the entities capable of caching that memory block had done so and may now potentially have a newer copy than the copy in memory module 110.

Figure 6:
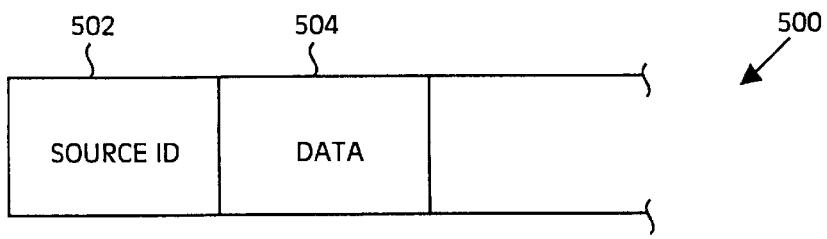
FIG. 6 shows in greater detail, in accordance with one aspect of the present invention, the format of a typical response to the request of FIG. 5.

FIG. 6 shows in greater detail in accordance with one aspect of the present invention the format of a response 500. Response 500 is typically issued by the entity responding to an earlier issued memory access request, e.g., one having the format of memory access request 400 of FIG. 5. As is shown in FIG. 6, response 500 includes a source ID (SID) field 502, representing the unique ID of the requesting entity to which the response should be sent. In one embodiment, the content of SID field 502 is substantially similar to the SID data contained in source ID field 406 of FIG. 4. The use of the source ID permits coherence transformer 200 to communicate directly with common bus 108 and entitles coherence transformer 200 to rely on the mechanism of common bus 108 to forward the response, using the SID, to the appropriate final destination. Response 500 further includes a data field 504, representing the content of the relevant memory block.

Figure 7:
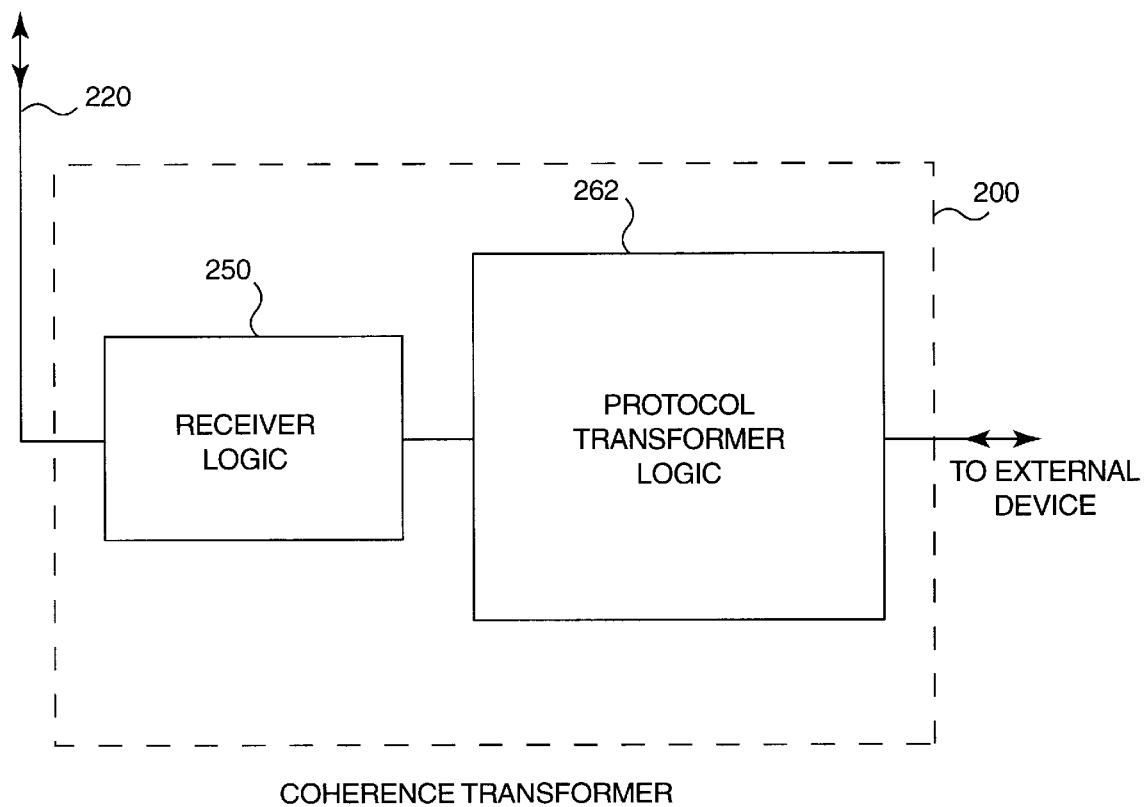
FIG. 7 shows, in one embodiment, the functional units within the coherence transformer.
Figure 7A:
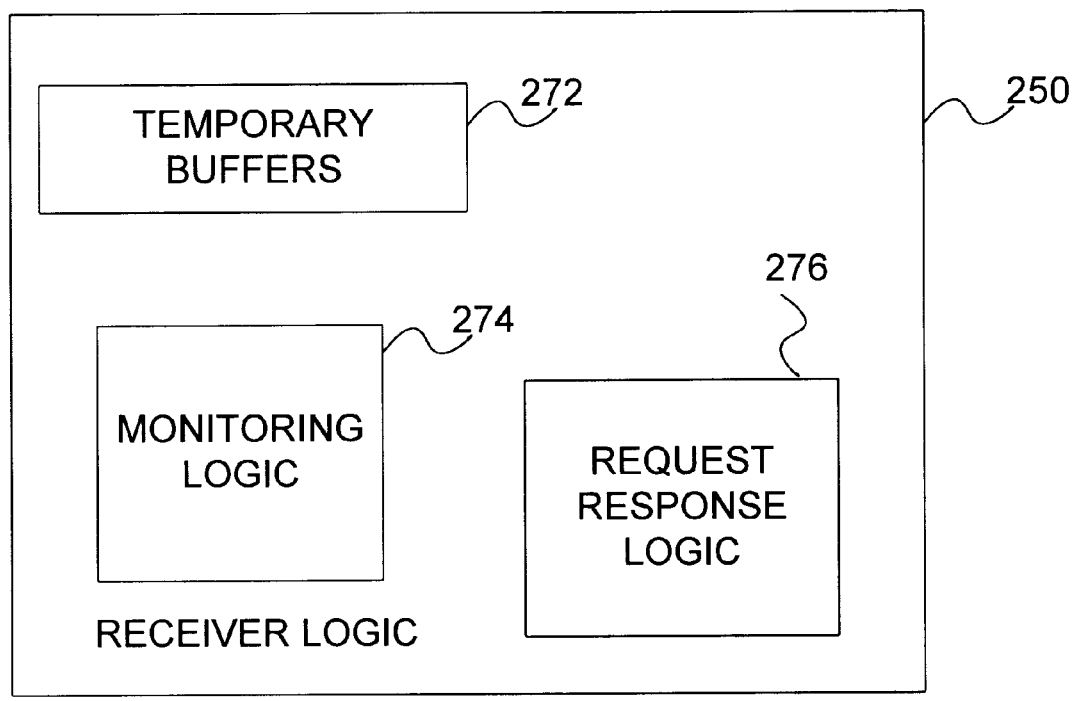
FIG. 7a is a block diagram of the receiver logic of FIG. 7 is greater detail according to one embodiment of the invention.

FIG. 7 shows, in one embodiment, the functional units within coherence transformer 200. In one embodiment, the functional units are implemented as digital logic circuits. As can be appreciated by those skilled in the art, however, these functional units may be implemented either in hardware (digital or analog) or in software, depending on needs. Within coherence transformer 200, there is provided receiver logic 250, representing the functional unit employed for receiving selected memory access requests from common bus 108 of FIG. 2. Receiver logic 250 may be implemented using any conventional technology suitable for identifying particular selected transactions as pertaining to coherence transformer 200. FIG. 7a is a block diagram of the receiver logic 250 of FIG. 7 is greater detail according to one embodiment of the invention. The receiver logic 250 is shown as including temporary buffers 272, monitoring logic 274 and request response logic 276.

It should be apparent to those skilled in the art from the foregoing that some type of protocol conversion may be necessary to permit devices and systems utilizing different protocols and/or operating at different speeds to share memory blocks. Protocol transformer unit 262 represents the unit that permits coherence transformer 200 to communicate with the external devices, e.g., one of external devices 202, 204, and 206. The job of protocol transformer unit 262 includes translating data received in one protocol from the internal domain to enable that data to be transmitted, using another protocol, to external devices in the external domain and vice versa. Protocol transformer unit 262 may be omitted, for example, if the external device employs the same protocol as that employed in computer node 100 and/or operates at the same speed.

Keep in mind that the specific protocol employed to communicate with a specific external device may vary greatly depending on the specification of the protocol employed within that external device. As will be discussed in greater detail herein, it will be assumed that communication for the purpose of sharing memory blocks between coherence transformer 200 and the external devices can be accomplished using a generalized protocol known as the X-protocol. The adaptation of the X-protocol, details of which are described herein, to a specific external device is within the skills of those skilled in the art given this disclosure.

FIGS. 8 and 9 show, in one embodiment, the memory access requests and responses issued by a bus entity, e.g., any of the entities coupled to common bus 108 such as processing units 102, 104, 106 or coherence transformer 200. In the description that follows, it is assumed for simplicity of illustration that there is only one bus entity internal to computer node 100, e.g., processing unit 102, being coupled to common bus 108. If there are more than one internal bus entities coupled to common bus 108, e.g., both processing units 102 and 104 are present on common bus 108, the resolution of coherence problems among these internal bus entities may be resolved using any conventional method.

By way of example, one solution to such coherence problems involves requiring each internal bus entity to snoop bus 108. If the snooped memory access request involves a memory block whose latest copy is cached by that internal bus entity, that internal bus entity may intervene to respond to the outstanding memory access request before memory module 110 may respond. An internal bus entity may ignore an outstanding memory access request if the request does not involve a memory block cached by that internal bus entity. If no internal bus entity intervenes, memory module 110 is implicitly responsible for responding with the copy it currently possesses.

Referring now to FIGS. 8 and 9, a bus entity, e.g., processing node 102, may issue a memory access request for an exclusive copy of memory block 112(a) by issuing a request to own (RTO) request. In the description that follows, a request may have the form of request 400 of FIG. 5. On the other hand, a response may have the form of response 500 of FIG. 6.

If no other internal bus entities intervenes responsive to the RTO request, memory module 110 may respond to the outstanding RTO request with a RTO_data to furnish the RTO progenitor with a copy of the requested memory block from memory module 110, along with the state of that memory block (i.e., the content of the associated Mtag). Alternatively, if the RTO request is erroneous, e.g., requesting a non-existent memory block, memory module 110 may reply with a RTO-nack response, signifying that the RTO request is not acknowledged and needs to be retried by the RTO progenitor.

Once the RTO_data response is received by the RTO progenitor from memory block 110, i.e., by processing unit 102 in this example, the RTO progenitor then examines the state of the enclosed Mtag to determine whether the current copy of the memory block received from memory module 110 can be employed to service the issued RTO request. If the state is gI, for example, it is understood that an external device currently has the exclusive copy of the memory block, and the RTO progenitor may issue a request to obtain that copy and invalidate all external copies via the remote RTO memory access request (RRTO). Details regarding the RTO and RRTO requests, as well as other requests described herein, are discussed more fully herein, particularly with reference to FIG. 8.

If the Mtag state is gS, at least one external bus entity has a shared, read-only copy. In this case, it will be necessary to invalidate all shared copies existing internally and externally, and respond to the outstanding RTO request with the latest copy. If the state is gM, one of the internal entities has the latest valid copy and the RTO progenitor may proceed to employ the data returned in the RTO_data response from memory module 110 to satisfy its RTO needs (since it is assumed herein that there is no other internal entity to intervene with a later copy).

A remote RTO (RRTO) memory access request is typically issued by an RTO progenitor after that RTO progenitor finds out, by ascertaining the state of the Mtag received from memory module 110, that the state of the Mtag is insufficient to service the current RTO request. Insufficient Mtag states in this case may be gS or gI, i.e., there may be a shared or exclusive copy of the requested memory block existing externally. If the RRTO is issued by the RTO progenitor responsive to a gM Mtag, coherence transformer 200 understands this to be an error condition (since state gM indicates that the internal domain, not the external domain, currently has the exclusive copy of the requested memory block) and may request the RRTO progenitor to retry to obtain the exclusive copy from the internal domain.

If the RRTO is issued by the RTO progenitor responsive to a gS Mtag, coherence transformer 200 may respond to this RRTO command by invalidating external shared copy or copies, obtaining the latest copy of the requested memory block either from the external domain or the internal domain, invalidating all internal shared copy or copies, and returning that copy to the RRTO progenitor via the RTOR_data response. If the RRTO is issued by the RTO progenitor responsive to a gI Mtag, coherence transformer 200 may respond to this RRTO command by obtaining the external exclusive copy, invalidating that external exclusive copy, and returning that copy to the RRTO progenitor via the RTOR_data response. Further, coherence transformer 200 may perform a write back to memory module 110 to change the state of the Mtag corresponding to the requested memory block to gM via the RTOR response. If the RRTO request is erroneous, e.g., requesting a non-existent memory block, coherence transformer 200 may reply with a RTOR_nack response, signifying that the RRTO request is not acknowledged and needs to be retried by the RRTO progenitor.

A bus entity, e.g., processing node 102, may issue a memory access request for a shared, read-only copy of memory block 112(a) by issuing a RTS request. If no other internal bus entities intervenes, memory module 110 may respond to the outstanding RTS request with a RTS_data to furnish the RTS progenitor with a copy of the requested memory block from memory module 110, along with the state of that memory block (i.e., the content of the associated Mtag). Alternatively, if the RTS request is erroneous, e.g., requesting a non-existent memory block, memory module 110 may reply with a RTS-nack response, signifying that the RTS request is not acknowledged and needs to be retried by the RTS progenitor.

Once the RTS_data response is received by the RTS progenitor from memory block 110, i.e., processing unit 102 in this example, the RTS progenitor then examines the state of the enclosed Mtag to determine whether the current copy of the memory block received from memory module 110 can be employed to service the current RTS need. Generally, if the state of the Mtag is gS, at least one internal bus entity currently has a shared, read-only copy and this RTS memory access request can be serviced either by another internal bus entity or by the data received from memory module 110 itself. If the state of the Mtag is gM, at least one internal bus entity currently has an exclusive copy and this RTS memory access request can be serviced either by another internal bus entity or by the data received from memory module 110 itself.

If the state is gI, it is understood that an external device currently has the exclusive copy of the memory block and the RTS progenitor may issue a request to obtain that copy via the remote RTS memory access request (RRTS). If for some reason the RRTS is issued by the RTS progenitor responsive to a gM or gS Mtag, coherence transformer 200 understands this to be an error condition and will request the RTS progenitor to retry to obtain the shared copy from the internal bus entities. If the RRTS is issued by the RTS progenitor responsive to a gI Mtag, coherence transformer 200 may respond to this RRTS command by obtaining the shared copy of the requested memory block from the external device and returning that copy to the RRTS progenitor via the RTSR_data response. Further, coherence transformer 200 performs a write back to memory module 110 to change the state of the Mtag corresponding to the requested memory block to gS (via the RTSR response). If the RRTS request is erroneous, e.g., requesting a non-existent memory block, coherence transformer 200 may reply with a RTSR_nack response, signifying that the RRTS request is not acknowledged and needs to be retried by the RRTS progenitor.

Either one of the processing nodes, e.g., processing node 102, or coherence transformer 200 (on behalf of an external device) may issue a write back (WB) request to write back to memory 110 an exclusive copy of a memory block it earlier cached. If the WB request is erroneous, e.g., requesting a non-existent memory block, memory module 110 may reply with a WB_nack response, signifying that the WB request is not acknowledged and needs to be retried by the WB progenitor.

On the other hand, if no WB_nack response is issued, the WB progenitor may follow up with a WB_data response to write back the memory block to memory module 110. Further, the state of the Mtag in memory module 110 may also be changed to gM (if coherence transformer 200 requests the write back) to reflect the fact that the internal domain now has the exclusive copy of this memory block.

As mentioned earlier, when there is a remote memory access request, e.g., an RRTO or a RRTS, on common bus 108, coherence transformer 200 (via coherence transformer link 220) receives this memory access request and formulates an appropriate response depending on the state of the Mtag. The operation of the coherence transformer 200 may be more clearly understood with reference to FIGS. 10 and 11.

FIG. 10 illustrates, in one embodiment of the present invention, selected transactions performed by coherence transformer 200 in response to remote memory access requests on common bus 108. Referring now to FIG. 10, when a remote memory access request is issued by one of the internal bus entities on common bus 108, this remote memory access request is forwarded to all bus entities, including coherence transformer 200. The remote request may be, however, ignored by all internal bus entities, e.g., processor 102. Responsive to the remote request, coherence transformer 200 ascertains the current state of the Mtag (included in the remote request) to determine whether one of the external devices has an appropriate copy of the requested memory block for responding to the remote memory access request on common bus 108.

Remote Request to Own (RRTO)

If the remote memory access request is a request for an exclusive copy of a memory block (a RRTO) and the current Mtag state is gM, coherence transformer 200 understands this to be an error condition (since state gM indicates that the internal domain, not the external domain, currently has the exclusive copy of the requested memory block) and may request the RRTO progenitor to retry to obtain the exclusive copy from the internal domain.

If the RRTO is issued by the RTO progenitor responsive to a gS Mtag, coherence transformer 200 may respond to this RRTO command by invalidating external shared copy or copies by issuing the X-protocol invalidate command XINV to request all external devices to invalidate their shared copies. Coherence transformer 200 may either broadcast the X-protocol commands or may simply direct the X-protocol command to the appropriate external device(s) if there is provided logic, either in hardware or software, with coherence transformer 200 for keeping track of the locations and types of memory blocks cached.

When all external copies have been invalidated (confirmed by the receipt of the X-protocol XINV_nack response) coherence transformer 200 may then obtain the latest copy of the requested memory block from the internal domain and invalidate all internal shared copy or copies. In one embodiment, coherence transformer 200 may obtain the latest copy of the requested memory block from the internal domain and invalidate all internal shared copy or copies by issuing a RTO request to common bus 108. Upon receiving the requested copy from the internal domain (via the RTO_data response), coherence transformer 200 may write back the copy to memory module 110 along with the appropriate Mtag, i.e., gM in this case, via the RTOR response. Thereafter, coherence transformer 200 may provide the requested copy to the RRTO progenitor via the RTOR_data response.

Note that the use of the XINV command advantageously invalidates all shared copies of the requested memory block cached by the external device(s). Further, the use of the RTO request by coherence transformer 200 to common bus 108 advantageously ensures that all internal shared copies within computer node 100 are invalidated and obtains the required memory block copy to forward to the requesting entity, i.e., the RRTO progenitor.

If the RRTO request is issued by the RTO progenitor responsive to a gI Mtag, coherence transformer 200 may respond to this RRTO command by obtaining the external exclusive copy and invalidating that external exclusive copy via the X-protocol XRTO request. When the external exclusive copy is obtained (via the X-protocol XRTO_data response), coherence transformer 200 may perform a write back to memory module 110 to change the state of the Mtag corresponding to the requested memory block to gM via the RTOR response. Further, coherence transformer 200 may return the copy of the requested memory block to the RRTO progenitor via the RTOR_data response.

Remote Request to Share (RRTS)

If the remote memory access request is a request for a shared copy of a memory block (a RRTS) and the current state of the Mtag is gM or gS, coherence transformer 200 understands this to be an error condition (since these states indicate that there is at least one valid, i.e., shared or exclusive, copy internally) and will request the RTS progenitor to retry to obtain the shared copy from the internal bus entities. If the RRTS is issued by the RTS progenitor responsive to a gI Mtag, coherence transformer 200 may respond to this RRTS command by obtaining the shared copy of the requested memory block from the external device (via the X-protocol XRTS request). When the external shared copy is obtained (via the X-protocol XRTS_data response), coherence transformer 200 may perform a write back to memory module 110 to change the state of the Mtag corresponding to the requested memory block to gS via the RTSR response. Further, coherence transformer 200 may return the copy of the obtained memory block to the RRTS progenitor via the RTSR_data response.

Coherence transformer 200 not only interacts with the processing nodes within computer nodes 100 to respond to remote memory access requests issued by those processing nodes, it also interacts with the external devices, e.g., external devices 202, 204, and 206, in order to service memory access requests pertaining to memory blocks having local physical addresses within computer node 100.

FIG. 11 illustrates selected transactions performed by coherence transformer 200 in response to memory access requests from one of the external devices. In FIG. 11, the memory access requests are issued, using the aforementioned generalized X-protocol, by one of the external devices, e.g., one of devices 202, 204, or 206, to coherence transformer 200. If another external device currently caches the required copy of the requested memory block, this memory access request is preferably handled by logic circuitry provided with coherence transformer 200 without requiring the attention of coherence transformer 200 itself.

On the other hand, if another external device does not have the valid copy of the requested memory block to service the memory access request, coherence transformer 200 then causes a memory access request to appear on common bus 108, using a protocol appropriate to computer node 100, so that coherence transformer 200 can obtain the required copy of the requested memory block on behalf of the requesting external device. Further, since a copy of the memory block is now cached by an external device, the Mtag associated with this memory block may need to be changed in memory module 110 to reflect this change.

XRTO Memory Access Request

Referring now to FIG. 11, when an external device issues a memory access request to obtain an exclusive copy of a memory block having a local physical address within computer node 100, e.g., memory block 112(a), it issues a XRTO request to coherence transformer 200. Coherence transformer 200 then obtains the copy of the requested memory block from the internal domain and invalidates all internal copies of the request memory block (by issuing a RTO request to common bus 108). After receiving the copy of the requested memory block, coherence transformer 200 then ascertains the state of the associated Mtag to determine its next course of action.

If the state of the Mtag (contained in the RTO_data response) is gI, coherence transformer 200 understands this to be an error since the external domain does not have the exclusive copy (otherwise it would not need to request the exclusive copy from the internal domain) and the internal domain does not have either a shared or exclusive copy (gI Mtag state). The error condition may be handled using a variety of conventional techniques, e.g., flag the error and/or perform a software or hardware reset.

On the other hand, if the state of the Mtag is gM or gS, coherence transformer 200 then writes back to memory module 110 (via the WB request and WB_data response) the new state, i.e., gI, to signify that there is no longer a valid copy of the requested memory block in the internal domain. In one embodiment, the write back may be performed with only the new state gI and without any other data for the requested memory block to save bandwidth on common bus 108 (since any data associated with an invalid Mtag state would be ignored anyway). Thereafter, coherence transformer 200 may forward the copy of the obtained memory block to the requesting external device via the X-protocol XRTO_data response.

XRTS Memory Access Request

When an external device issues a memory access request to obtain a shared copy of a memory block having a local physical address within computer node 100, e.g., memory block 112(a), it issues a XRTS request to coherence transformer 200. Coherence transformer 200 then obtains the copy of the requested memory block from the internal domain and writes the gS state to memory module 110 (by issuing a RTSM request to common bus 108 and receives the RTSM_data response). If the state of the Mtag is gI, coherence transformer 200 typically would receive a response from the memory module with Mtag gI. If the response is received and the Mtag state contained in the RTSM_data response is gI or, for some reason, there is no response, coherence transformer 200 understands this to be an error since the external domain does not have the exclusive copy (otherwise it would not need to request the exclusive copy from the internal domain) and the internal domain does not have either a shared or exclusive copy (gI Mtag state). The error condition may be handled using a variety of conventional techniques, e.g., flag the error and/or perform a software or hardware reset.

On the other hand, if the state of the Mtag is gM or gS, coherence transformer 200 may forward the copy of the obtained memory block to the requesting external device via the X-protocol XRTS_data response.

Note that the RTSM and RTSM_data sequence may equally be substituted by a sequence containing RTO (from coherence transformer 200 to common bus 108), RTO_data (from common bus 108 to coherence transformer 200), WB (from coherence transformer 200 to common bus 108 to ask permission to write to memory module 110), and WB_data (writing the gS Mtag to the corresponding memory block in memory module 110.

XWB Request

When an external device issues a request to write back an exclusive copy of a memory block it earlier cached from computer node 100, it issues an X-protocol XWB request to coherence transformer 200. Coherence transformer 200 may then obtain a copy of the requested memory block from the internal domain to ascertain the current state of the associated Mtag. If the current state is gM or gS, coherence transformer 200 understands this to be an error since the external domain, which requests to write back, must have the only valid, exclusive copy and there must be no other valid (whether exclusive or shared) copy of the same memory block anywhere else in the computer system. The error condition may be handled using a variety of conventional techniques, e.g., flag the error and/or perform a software or hardware reset.

On the other hand, if the state of the Mtag is gI, coherence transformer 200 then proceeds to receive from the external device the data to be written back (via the X-protocol XWB_data response) and writes this data, along with the new gM Mtag state, to the appropriate memory location in memory module 110. In one embodiment, the writing of both the data and the gM Mtag state can be accomplished by issuing a WSgM command to common bus 108, which requests the writing of both data and new Mtag, to be followed by the data and the new gM Mtag in the WSgM_data command.

Note that the WSgM and WSgM_data sequence may well be substituted by a sequence containing RTO (from common bus 108 on behalf of memory module 110 to coherence transformer 200), RTO_data (from coherence transformer 200 to common bus 108 to furnish the old data overwritten from memory module 110), WB (from coherence transformer 200 to common bus 108 to ask permission to write to memory module 110), and WB_data (writing the gM Mtag to the corresponding memory block in memory module 110).

Advantageously, the use of a coherence transformer and the tightly-coupled request-response transactions, permit external devices, which may be employing protocols different from the protocol on common bus 108 of computer node 100, to share memory blocks having local physical addresses within computer node 100. Further, coherence transformer 200 makes this sharing possible even if the external devices may each be operating at a different operating speed from that on common bus 108.

Note that the external devices do not need to accommodate Mtags to participate in memory sharing. Only the bus entities, e.g., memory module 110, the processors coupled to common bus 108, and coherence transformer 200, need to be aware of the existence of Mtags to employ them in avoiding coherence problems. Consequently, this feature of coherence transformer 200 advantageously permits a properly configured computer node 100 to work with a wide range of existing external devices to facilitate memory sharing without requiring any modification to the external devices.

The present invention advantageously permits the external devices to cache any number of memory blocks. Due to the existence of Mtags, coherence transformer 200 advantageously does not need to keep track of every memory block currently cached by the external devices for the purpose of deciding whether coherence transformer 200 should intervene in servicing a memory access request on common bus 108. In accordance with one aspect of the invention, the bus entity that obtains the memory block from memory module 110 decides for itself, upon ascertaining the Mtag state of the obtained memory block, whether it needs to further request a more recent copy from the external device (via the remote requests RRTO and RRTS directed at coherence transformer 200). This is in sharp contrast with, and a significant improvement over, techniques in which there is a need to keep track of every memory block cached externally. In such techniques, a large memory space is typically required to keep track of all memory blocks currently cached by the external devices, which tends to increase both the memory overhead and the time required to search through and determine whether intervention is necessary.

In one embodiment, coherence transformer is provided with at least one buffer block 201 for temporarily storing a copy of the memory block most recently accessed by one of the external device. The buffer block may store both the address of the memory block and the relevant Mtag data. The buffer block advantageously permits coherence transformer 200 to perform write back to memory module 110 to change the state of the Mtag in memory module 110.

In the interval after coherence transformer 200 obtains the copy of the memory block requested and before coherence transformer 200 performs a write back to change the Mtag, e.g., responsive to a XRTO request from an external device, coherence transformer 200 may, using the data stored in the buffer, monitor common bus 108 to intervene. The intervention may be necessary if, for example, another internal bus entity requests this memory block during the aforementioned interval. The intervention essentially involves coherence transformer 200 servicing memory access requests for memory blocks tracked in the buffer(s). By way of example, one technique for servicing memory access requests via the snooping action of a coherence transformer is described in the commonly assigned, copending patent application entitled "Methods And Apparatus For A Coherence Transformer For Connecting Computer System Coherence Domains" by Hagersten et al., filed concurrently herewith and incorporated herein by reference (Reference Number P1519).

Note that once the write back is performed to change the Mtag to the appropriate state, it is no longer necessary to keep a copy of that memory block in the buffer. Because a copy of a memory block is typically kept in a buffer for a very short time, the number of buffers required may be quite small advantageously minimizing any latency associated with looking up the buffers to determine whether intervention is necessary.

Further, since a response to an externally-originated memory access request, e.g., XRTO, XRTS or XWB, requires knowledge of the state of the corresponding Mtag, there is optionally provided, as an optimization technique in one embodiment, an Mtag cache array for tracking some or all memory blocks of memory module 110. For example, an Mtag cache array may be provided to track only the Mtag states of the memory blocks externally cached. Alternatively, an Mtag cache array may be employed to track the Mtag states of every memory block in memory module 110.

As another embodiment, an Mtag cache array may be provided to track only memory blocks whose Mtag states are gS and gI. This embodiment is particularly advantageous in computer systems in which a relatively small number of memory blocks are externally cached at any given time. In such a computer system, most memory blocks would have a gM state, and relatively few would have gS and gI Mtag states When coherence transformer 100 requires knowledge of the Mtag state associated with a given memory block, it checks the Mtag cache array first. In case of a cache hit, no bandwidth of common bus 108 is required to ascertain the Mtag state. In case of the cache miss, coherence transformer 200 may proceed to inquire, via common bus 108 as discussed herein, the state of the associated Mtag to determine its proper course of action. Note that the presence of an Mtag cache array is not absolutely necessary and it is equally well to have an implementation wherein no Mtag caching is performed (in which case coherence transformer inquires, via common bus 108, the Mtag state when it needs this information).

The invention has been described as allowing one coherence transformer per bus. System designers may, in some cases, want to attach several coherence transformers to a bus to connect many alternative devices of the same or different types, e.g. I/O devices, distributed shared memory (DSM) memory agents, coherence domain devices, and the like. The implementation of multiple coherence transformers would be apparent to those skilled in the art given this disclosure. In a multiple coherence transformer implementation, Mtags may be extended with a field to identify which coherence transformer has the block externally so that processors know which coherence transformer should receive the appropriate RRTO's and RRTS's.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system having a computer node which has a common bus, a method for enabling an external device to share memory blocks having local physical addresses in a memory module at said computer node irrespective whether said external device and said common bus both employ a common protocol and irrespective whether said external device and said common bus both operate at the same speed, each of said memory blocks having an associated Mtag for tracking a state associated with said each of said memory blocks, including a state for indicating that said each of said memory blocks is exclusive to said computer node, a state for indicating that said each of said memory blocks is shared by said computer node with said external device, and a state for indicating that said each of said memory blocks is invalid in said computer node, said method comprising:

receiving, at a coherence transformer coupled to said common bus, a first memory access request for a first memory block from said external device;

obtaining said first memory block, using said coherence transformer, from said common bus;

modifying, using said coherence transformer, a first Mtag associated with said first memory block in said memory module at said computer node to reflect that said external device is caching a valid copy of said first memory block; and sending said valid copy of said first memory block from said coherence transformer to said external device.

2. The method of claim 1 wherein said first memory access request from said external device represents a request for an exclusive copy of said first memory block and said step of modifying said first Mtag includes a step of changing said first Mtag in said memory module to an invalid state.

3. The method of claim 2 further comprising a step of invalidating all valid copies of said first memory block at said computer node.

4. The method of claim 1 wherein said first memory access request from said external device represents either a request for an exclusive copy of said first memory block or a request for a shared copy of said first memory block, and said method further includes the steps of:

prior to said modifying step, examining said first Mtag associated with said first memory block; and proceeding with said modifying step and said sending step only if said first Mtag does not represent an invalid state.

5. The method of claim 1 wherein said first memory access request from said external device represents a request for a shared copy of said first memory block and said step of modifying said first Mtag includes a step of changing said first Mtag in said memory module to a shared state.

6. The method of claim 5 further including the steps of:

prior to said modifying step, examining said first Mtag associated with said first memory block;

proceeding with said modifying step and said sending step only if said first Mtag does not represent an invalid state; and if said first Mtag represents an invalid state, flagging an error condition.

7. The method of claim 1 further comprising the steps of:

receiving a write back request for said first memory block from said external device at said coherence transformer;

obtaining said valid copy of said first memory block, using said coherence transformer, from said external device;

writing said valid copy of said first memory block from said coherence transformer to said memory module at said computer node; and modifying, using said coherence transformer, said first Mtag associated with said first memory block in said memory module at said computer node to reflect that said computer node has an exclusive copy of said first memory block.

8. The method of claim 7 wherein said writing of said valid copy of said first memory block step and said modifying of said first Mtag to reflect an exclusive copy step are accomplished via a single command issued by said coherence transformer.

9. The method of claim 1 wherein said memory blocks are shared between said external device and said computer node through said coherence transformer without requiring said coherence transformer to track whether a given memory block is cached by said external device.

10. In a computer system having a computer node which has a common bus, a method for enabling an external device to share memory blocks having local physical addresses in a memory module at said computer node through a coherence transformer coupled to a common bus of said computer node irrespective whether said external device and said common bus both employ a common protocol and irrespective whether said external device and said common bus both operate at the same speed, each of said memory blocks having an associated Mtag for tracking a state associated with said each of said memory blocks, including a state for indicating that said each of said memory blocks is exclusive to said computer node, a state for indicating that said each of said memory blocks is shared by said computer node with said external device, and a state for indicating that said each of said memory blocks is invalid in said computer node, said method comprising:

receiving, at said memory module via said common bus, a first memory access request for a valid copy of a first memory block of said memory blocks from a progenitor of said first memory access request, said progenitor being an entity different from said coherence transformer;

responding to said first memory access request by sending a first copy of said first memory block, along with a first Mtag corresponding to said first memory block, from said memory module to said progenitor of said first memory access request;

examining, using said progenitor of said first memory access request, said first Mtag state; and if said first Mtag state is invalid, issuing a second memory access request pertaining to said first memory block from said progenitor of said first memory access request to request said coherence transformer to service said second memory access request, thereby enabling said progenitor of said first memory access request to obtain said valid copy of said first memory block.

11. The method of claim 10 wherein said first memory access request represents a request for an exclusive copy of said first memory block, and said method, if said first Mtag state is invalid, further comprises:

obtaining a second copy of said first memory block, using said coherence transformer, from said external device;

invalidating said second copy of said first memory block at said external device;

sending, using said coherence transformer via said common bus, said second copy of said first memory block to said progenitor of said second memory access request; and changing, using said coherence transformer via said common bus, said first Mtag state in said memory module to an exclusive state.

12. The method of claim 10 wherein said first memory access request represents a request for an exclusive copy of said first memory block, and said method, if said first Mtag state is shared, further comprises:

issuing said second memory access request pertaining to said first memory block from said progenitor of said first memory access request to request said coherence transformer to service said first memory access request.

13. The method of claim 12 further comprising:

invalidating a second copy of said first memory block at said external device;

obtaining said first copy of said first memory block, using said coherence transformer via said common bus, from said computer node;

invalidating all copies of said first memory block in said computer node;

sending said first copy of said first memory block from said coherence transformer to said progenitor of said second memory access request; and changing, using said coherence transformer via said common bus, said first Mtag state to an exclusive state.

14. The method of claim 10 wherein said first memory access request represents a request for a shared copy of said first memory block, said method, if said first Mtag state is invalid, further comprises:

obtaining a second copy of said first memory block, using said coherence transformer, from said external device;

sending, using said coherence transformer via said common bus, said second copy of said first memory block to said progenitor of said second memory access request; and changing, using said coherence transformer via said common bus, said first Mtag state in said memory module to a shared state.

15. The method of claim 14 further comprising:

if said first Mtag state is either a shared state or an exclusive state, flagging an error condition.

16. The method of claim 10 further comprising:

temporarily tracking said first memory block, including knowledge regarding a state of said first memory block in either said computer node or in said external device, in a temporary buffer associated with said coherence transformer; and if a third memory access request pertaining to said first memory block appears on said common bus prior to said second memory access request being completely serviced, intervening, using said coherence transformer, to prevent said memory module from servicing said third memory access request.

17. The method of claim 16 further comprising:

if said second memory access request is completely serviced, unallocating said temporary buffer to enable said temporary buffer to be used in temporarily tracking another memory block associated with another memory access request by said external device.

18. The method of claim 10 further comprising:

receiving, at a coherence transformer coupled to said common bus, a third memory access request for a second memory block from said external device;

obtaining said second memory block, using said coherence transformer, from said common bus;

modifying, using said coherence transformer, a second Mtag associated with said second memory block in said memory module at said computer node to reflect that said external device is caching a valid copy of said second memory block; and sending said valid copy of said second memory block from said coherence transformer to said external device.

19. The method of claim 18 wherein said third memory access request from said external device represents a request for an exclusive copy of said first memory block and said step of modifying said second Mtag includes a step of changing said second Mtag in said memory module to an invalid state.

20. The method of claim 19 further comprising a step of invalidating all valid copies of said second memory block at said computer node.

21. An apparatus for facilitating the sharing of memory blocks between a computer node and an external device, comprising:

receiver logic configured for coupling with a common bus of said computer node, said receiver logic being configured to receive, when coupled to said common bus, memory access requests specific to said apparatus on said common bus; and a protocol transformer logic coupled to said receiver logic for enabling said apparatus, when coupled to said external device, to communicate with said external device using a protocol suitable for communicating with said external device, whereby said sharing of said memory blocks is facilitated irrespective whether said external device and said common bus both employ a common protocol and irrespective whether said external device and said common bus both operate at the same speed, and wherein each of said memory blocks has a local physical address at a memory module of said computer node and an associated Mtag for tracking a state associated with said each of said memory blocks, including an exclusive state for indicating that said each of said memory blocks is exclusive to said computer node, a shared state for indicating that said each of said memory blocks is shared by said computer node with said external device, and an invalid state for indicating that said each of said memory blocks is invalid in said computer node.

22. The apparatus of claim 21 wherein said receiver logic includes a temporary buffer for temporarily storing an address and a state of a first memory block requested by a first memory access request issued by said external device, said temporary buffer being unallocated after an Mtag state of said first memory block is changed in said memory module to reflect that said first memory block is cached by said external device.

23. The apparatus of claim 22 further including:

monitoring logic for monitoring memory access requests on said common bus;

logic configured to respond to said first memory access request of said memory access requests on said common bus, said first memory access request pertaining to said first memory block while said address of said first memory block is temporarily stored in said buffer.

24. The apparatus of claim 21 wherein said receiver logic performs the operations of:

receiving a first memory access request from said external device, said first memory access request pertaining to one of said memory blocks;

issuing a second memory access request, responsive to said first memory access request, to said common bus to request a copy of said one of said memory blocks;

receiving said copy of said one of said memory blocks from said common bus;

writing a first Mtag state to said memory module to reflect the fact that said one of said memory blocks is cached by said external device; and sending said copy of said one of said memory blocks received from said common bus to said external device.

25. The apparatus of claim 24 wherein said first memory access request is a request for an exclusive copy of said one of said memory blocks, said first Mtag state representing said exclusive state.

26. The apparatus of claim 24 wherein said first memory access request is a request for a shared copy of said one of said memory blocks, said first Mtag state representing said shared state.

27. The apparatus of claim 21 wherein said receiver logic operates to obtain a copy of a first memory block from said external device, said copy of said first memory block representing a copy requested by one of said memory access requests specific to said apparatus.

28. The apparatus of claim 27 wherein said receiver logic operates to send said copy of said first memory block obtained from said external device to said common bus, thereby enabling a progenitor of said one of said memory access requests specific to said apparatus to obtain said copy of said first memory block.

29. A computer system having a computer node and an external device, said computer node having memory blocks with local physical addresses at said computer node, said computer system enabling said computer node and said external device to share said memory blocks, comprising:

receiver logic configured for coupling with a common bus of said computer node, said receiver logic being configured to receive, when coupled to said common bus, memory access requests specific to said computer system on said common bus; and a protocol transformer logic coupled to said receiver logic for enabling said computer system, when coupled to said external device, to communicate with said external device using a protocol suitable for communicating with said external device, whereby said sharing of said memory blocks is facilitated irrespective whether said external device and said common bus both employ a common protocol and irrespective whether said external device and said common bus both operate at the same speed, and wherein each of said memory blocks has a local physical address at a memory module of said computer node and an associated Mtag for tracking a state associated with said each of said memory blocks, including an exclusive state for indicating that said each of said memory blocks is exclusive to said computer node, a shared state for indicating that said each of said memory blocks is shared by said computer node with said external device, and an invalid state for indicating that said each of said memory blocks is invalid in said computer node.

30. The computer system of claim 29 wherein said receiver logic includes a temporary buffer for temporarily storing an address and a state of a first memory block requested by a first memory access request issued by said external device, said temporary buffer being unallocated after an Mtag state of said first memory block is changed in said memory module to reflect that said first memory block is cached by said external device.

31. The computer system of claim 30 further including:

monitoring logic for monitoring memory access requests on said common bus; and logic configured to respond to said first memory access request of said memory access requests on said common bus, said first memory access request pertaining to said first memory block while said address of said first memory block is temporarily stored in said buffer.

32. The computer system of claim 29 wherein said receiver logic performs the operations of:

receiving a first memory access request from said external device, said first memory access request pertaining to one of said memory blocks;

issuing a second memory access request, responsive to said first memory access request, to said common bus to request a copy of said one of said memory blocks;

receiving said copy of said one of said memory blocks from said common bus;

writing a first Mtag state to said memory module to reflect the fact that said one of said memory blocks is cached by said external device; and sending said copy of said one of said memory blocks received from said common bus to said external device.

33. The computer system of claim 32 wherein said first memory access request is a request for an exclusive copy of said one of said memory blocks, said first Mtag state representing said exclusive state.

34. The computer system of claim 32 wherein said first memory access request is a request for a shared copy of said one of said memory blocks, said first Mtag state representing said shared state.

35. The computer system of claim 29 wherein said receiver logic operates to obtain a copy of a first memory block from said external device, said copy of said first memory block representing a copy requested by one of said memory access requests specific to said computer system.

36. The computer system of claim 35 wherein said receiver logic operates to send said copy of said first memory block obtained from said external device to said common bus, thereby enabling a progenitor of said one of said memory access requests specific to said computer system to obtain said copy of said first memory block.

* * * * *